United States Patent
Owari

(10) Patent No.: US 8,014,017 B2
(45) Date of Patent: Sep. 6, 2011

(54) IMAGE PROCESSING APPARATUS FOR TRANSFERRING IMAGE DATA IN A COMPRESSED FORM

(75) Inventor: Atsushi Owari, Tokyo (JP)

(73) Assignee: Oki Data Corporation, Tokyo (JP)

( * ) Notice: Subject to any disclaimer, the term of this patent is extended or adjusted under 35 U.S.C. 154(b) by 816 days.

(21) Appl. No.: 12/003,436

(22) Filed: Dec. 26, 2007

(65) Prior Publication Data
US 2008/0158587 A1 Jul. 3, 2008

(30) Foreign Application Priority Data
Dec. 27, 2006 (JP) .................. 2006-350796

(51) Int. Cl.
*G06F 3/12* (2006.01)

(52) U.S. Cl. ...................................... 358/1.15

(58) Field of Classification Search .............. 358/1.13, 358/1.14, 1.15
See application file for complete search history.

(56) References Cited

FOREIGN PATENT DOCUMENTS

| JP | 10-079826 | | 3/1998 |
|---|---|---|---|
| JP | 2001-109591 | * | 4/2001 |
| JP | 2001-109591 A | | 4/2001 |
| JP | 2003-189046 | * | 7/2003 |
| JP | 2003-189046 A | | 7/2003 |
| JP | 2004-110848 A | | 4/2004 |
| JP | 2006-270191 | * | 10/2006 |
| JP | 2006-270191 A | | 10/2006 |

* cited by examiner

*Primary Examiner* — Benny Tieu
*Assistant Examiner* — Jeremiah Bryar
(74) *Attorney, Agent, or Firm* — Rabin & Berdo, P.C.

(57) ABSTRACT

An image processing apparatus is used for copying an original. A reading section reads an image of an original. An image forming section forms the image of the original on a medium. When an error detector has detected an error in the image processing apparatus, a network connecting section connects the image processing apparatus to a network so that a printer detector detects an external image forming apparatus connected to the network. Then, a selecting section selects the image forming apparatus connected to the network. The image forming apparatus is selected based on certain predetermined conditions. Then, an image transferring section transfers the image of the original to the image forming apparatus so that the image of the original is printed by the detected image forming apparatus.

4 Claims, 16 Drawing Sheets

FIG. 3

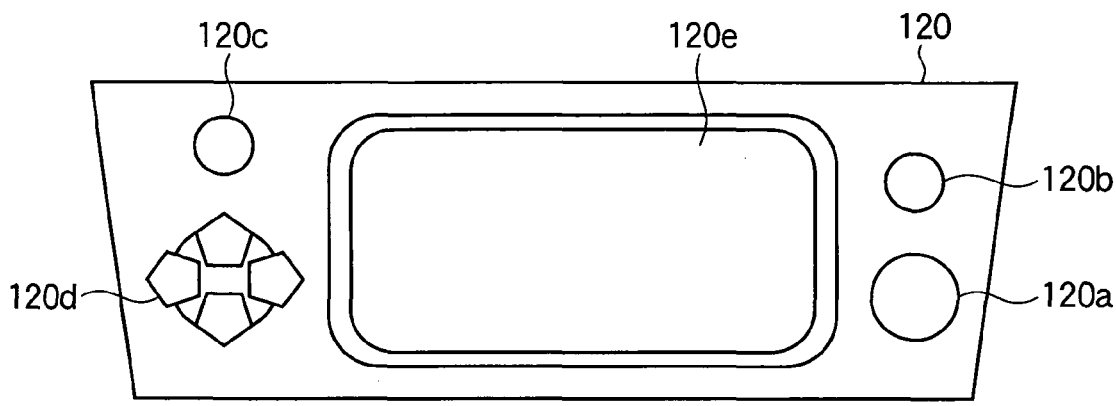

FIG. 4

INSTRUCTIONS

```
├─ COLOR ··················· COLOR/MONOCHROME
├─ N-UP  ····················· 1in1/2in1/4in1/(Horizontal)/4in1(Vertical)
├─ DUPLEX ················ Yes/No
├─ RESOLUTION ············ 300dpi/600dpi
├─ COMPRESSION METHOD ···· Raw / JPEG / JBIG / MMR / MH
├─ COPIES ·················· 1~99
```

※1 WHEN "COLOR" IS SELECTED, JBIG, MMR, AND MH CANNOT BE SELECTED.

※1 WHEN "MONOCHROME" IS SELECTED, JPEG CANNOT BE SELECTED.

FIG. 6

Command Container Structure

| Length(bytes) | Field Name | Value |
|---|---|---|
| 1 | Container Length | 0x04(FIXED) |
| 1 | Container Type | 0x00(FIXED) |
| 1 | Command Code | FIG. 7 |
| 1 | Parameter | FIG. 7 |

Response Container Structure

| Length(bytes) | Field Name | Value |
|---|---|---|
| 1 | Container Length | 0x04(FIXED) |
| 1 | Container Type | 0x02(FIXED) |
| 1 | Command Code | 0x00(Succussful)/0x01(Fail) |
| 1 | Parameter | FIG. 7 |

Data Container Structure

| Length(bytes) | Field Name | Value |
|---|---|---|
| 4 | Container Length | 0xXXXXXXXX VARIABLE |
| 1 | Container Type | 0x01(FIXED) |
| >1 | Data | FIG. 7 |

FIG. 7

| Command Code | Command | Description | Sequence Type |
|---|---|---|---|
| 0x01 | startScan | START TO READ ORIGINAL | ③ |
| 0x02 | cancelCopy | COPY CANCEL | ③ |
| 0x03 | setCopy | SETTING FOR COPYING | ① |
| 0x04 | checkPaper | CHECK FOR PAPER IN ADF | ② |
| 0x05 | readData | READ DATA | ② |

Sequence Type : REFER TO FIG. 5

| Command Code | Command Container Structure Parameter | Response Container Structure Parameter | Data Container Structure Data | |
|---|---|---|---|---|
| 0x01 | NULL (0X00) | NULL (0X00) | NO | |
| 0x02 | NULL (0X00) | NULL (0X00) | NO | |
| 0x03 | NULL (0X00) | NULL (0X00) | 1st BYTE : COLOR | 0x00(COLOR)/0x01(MONOCHROME) |
| | | | 2nd BYTE : N-UP | 0x00(1in1)/0x01(2in1)/0x02(4in1[Horizontal])/0x03(4in1[Vertical]) |
| | | | 3rd BYTE : DUPLEX | 0x00(No)/0x01(Yes) |
| | | | 4th BYTE : RESOLUTION | 0x00(300dpi)/0x01(600dpi) |
| | | | 5th BYTE : COMPRESSION METHOD | 0x00(Raw)/0x01(JPEG)/0x02(JPEG)/0x03(MMR)/0x04(MH) |
| | | | 6th BYTE : NUMBER OF COPIES | 0x10(WHEN THE NUMBER OF COPIES IS 16) |
| 0x04 | NULL (0X00) | NULL (0X00) | 0x00(PAPER ABSENT)/0x01(PAPER PRESENT) | |
| 0x05 | DataLength | pageInfo (0X00, 0X01) scanSense (0X00, 0X01) | IMAGE DATA | | dataLength : DATA SIZE TO READ
pageInfo : 0X00(MIDDLE OF PAGE)/0X01(END OF PAGE)
scanSense : 0X00(SCANNER READY STATE)/0X01(SCANNER BUSY STATE)

FIG. 8

| INFORMATION | VALUE | REMARK |
|---|---|---|
| DEVICE TYPE | 1.3.6.1.2.1.25.3.1.5 : 1 printer<br>1.3.6.1.2.1.25.3.1.6 : 2 HDD | |
| DEVICE STATE | 2 : ERROR<br>1 : WARNING<br>3 : OTHER | |
| STATUS CONDITION OF PRINTER | 1 : other<br>2 : unknown<br>3 : idle<br>4 : printing<br>5 : warmup | |
| COLOR/ MONOCHROME | 1 : Black<br>2 : Cyan<br>3 : Magenta<br>4 : Yellow | 1 : MONOCHROME |
| DUPLEX UNIT ATTACHED | 3 : FIXED | 3 : DUPLEX ATTACHED |
| PAGE DESCRIPTION LANGUAGE (PDL) OR FAMILY NAME OF CONTROL LANGUAGE | 1 : AUTO<br>2 : PCL<br>3 : PS | |
| DECODING FUNCTION | 1 : Raw<br>2 : JPEG<br>3 : JBIG<br>4 : MMR<br>5 : MH | 1 : WHEN NO DECODING FUNCTION AVAILABLE |

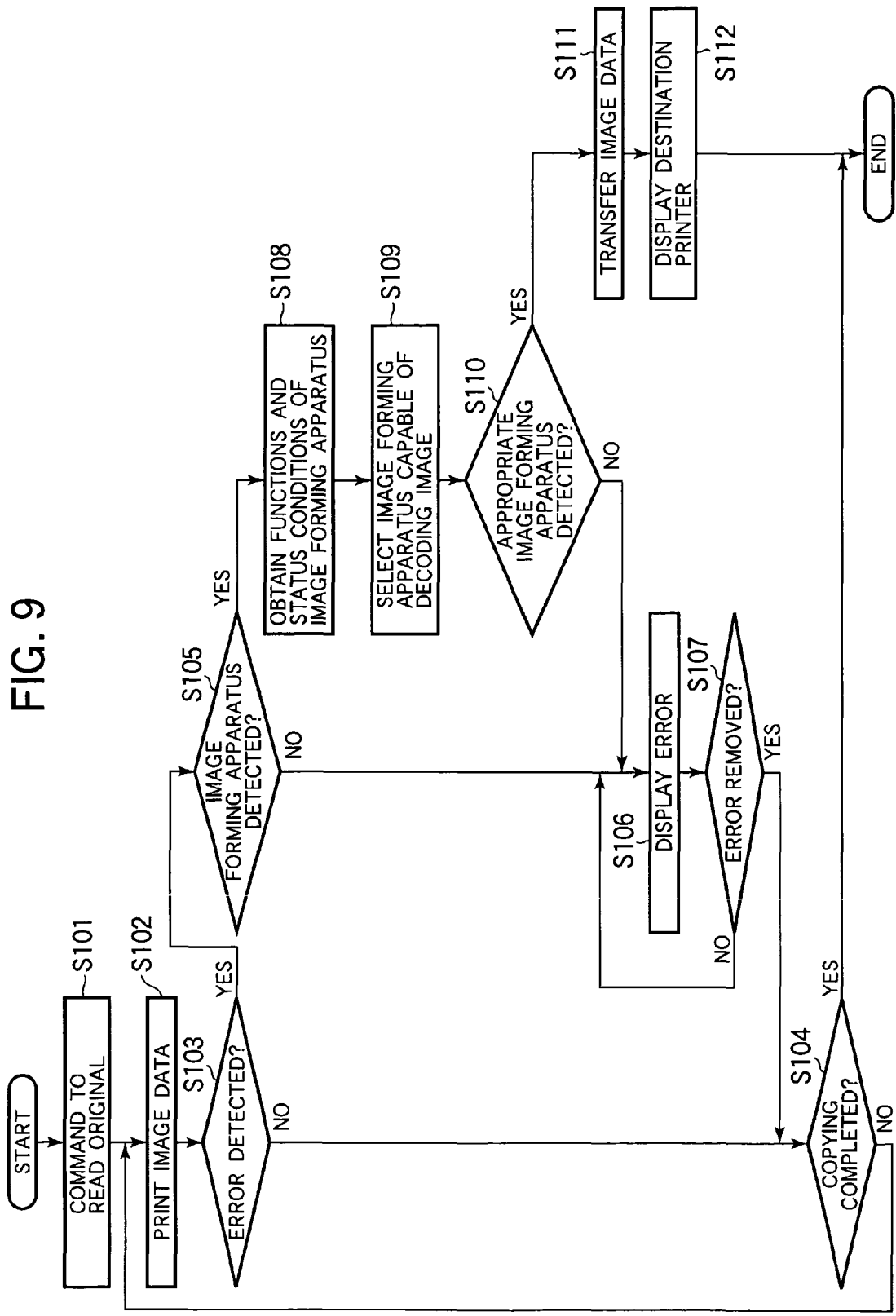

IMAGE PROCESSING APPARATUS FOR TRANSFERRING IMAGE DATA IN A COMPRESSED FORM

BACKGROUND OF THE INVENTION

1. Field of the Invention

The present invention relates to an image processing apparatus connected to a network.

2. Description of the Related Art

Among conventional image processing apparatuses capable of copying documents is one in which when an error occurs in an image forming section during a copying operation of image data, a user is notified of the occurrence of the error.

Image processing apparatuses having a known copying function usually include an image forming section that forms the image of an original obtained by scanning.

For example, Japanese Patent Application No. 10-79826 discloses a multi function printer (MFP) capable of notifying a user of occurrences of errors. A job administration table lists a job, a destination of an error message, and means for sending the error message. When an error handling section receives an error number, reference is made to a service administration table to identify a corresponding service and then an error notification is sent to the user of the job.

The multi function printer includes an identifying means for identifying types of processing that should be performed to handle the error, an administering means for administering information on error notifications for individual types of processing, and a notifying means for notifying the user of the error. Once the identifying means identifies an error, the notifying means notifies the user of the error by means of the information on error notifications.

The aforementioned conventional apparatus disclosed in Japanese Patent Application No. 10-79826 merely notifies a user of an error. For example, when an error has occurred, if image data read by, for example, a scanner remains in the apparatus, the user must handle the error properly before the image data in the apparatus may be printed out normally. With image processing apparatuses having a copying function, images may be formed by the image forming section incorporated in the apparatus only when no error occurs. As a result, when the image forming section of the image forming apparatus is unable to meet the user's demand, the image cannot be formed.

SUMMARY OF THE INVENTION

The present invention was made in view of the aforementioned drawbacks.

An object of the invention is to provide an image processing apparatus in which when an error occurs, image data remaining in the forming section may be transferred to another image forming apparatus that supports image formation of the image data so that the image data may be printed out regardless of the trouble.

Another object of the present invention is to provide an image processing apparatus where regardless of whether an error occurs in the image forming section of an image processing apparatus, and whether the image forming section supports the compression method of the image, the image data may be transferred to another image forming apparatus connected to the network, thereby assuring reliable image formation.

An image processing apparatus is used for copying an original. A reading section reads an image of an original. An image forming section forms the image of the original on a medium. When an error detector has detected an error in the image processing apparatus, a network connecting section connects the image processing apparatus to a network so that a printer detector detects an external image forming apparatus connected to the network. Then, a selecting section selects the image forming apparatus connected to the network. The image forming apparatus is selected based on certain predetermined conditions. Then, an image transferring section transfers the image of the original to the image forming apparatus so that the image of the original is printed by the detected image forming apparatus.

The image processing apparatus further includes a converting section that converts a compression form of image data. The reading section compresses the image of the original into image data of a first compression form. The converting section converts the image data of the first compression form into image data of a second compression form that is supported by the image forming apparatus.

An image processing apparatus is connected to a network. A reading section reads an image of an original. A detecting section detects an image forming apparatus connected to the network. A selecting section selects the image forming apparatus detected by the detecting section. An image data transferring section transfers the image data that describes the image of the original to the image forming apparatus selected by the selecting section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 3 illustrates the operation panel;

FIG. 4 is an example of specific instructions for controlling the scanner, the instructions being displayed on the operation panel;

FIG. 6 illustrates the structure of the respective container structure illustrated in FIG. 5;

FIG. 7 illustrates scanner controlling command codes used in the respective container structures;

FIG. 8 illustrates examples of MIB;

FIG. 9 is a flowchart illustrating the operation;

DETAILED DESCRIPTION OF THE INVENTION

First Embodiment

Figure 1:
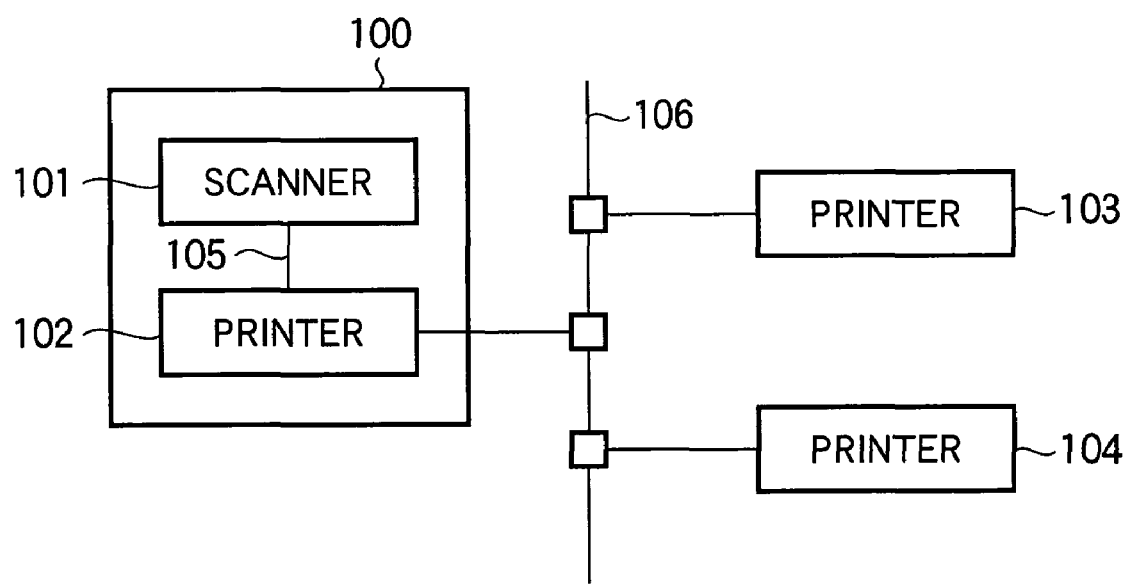
FIG. 1 illustrates the outline of a first embodiment.

FIG. 1 illustrates the general configuration of a first embodiment. Referring to FIG. 1, an image processing apparatus 100 (i.e., multi function printer, MFP) includes a scanner 101 and a printer 102. The printer incorporates image forming sections.

The scanner 101 and printer 102 are connected to each other via universal serial bus 2.0 (USB 2.0) 105. The printer 102 includes a network port connected to a printer 103 and a printer 104 via a local area network (LAN) 106.

The printer 103 is a post script printer that supports color printing, and is capable of decoding joint photographic experts group (JPEG) image data.

Figure 2:
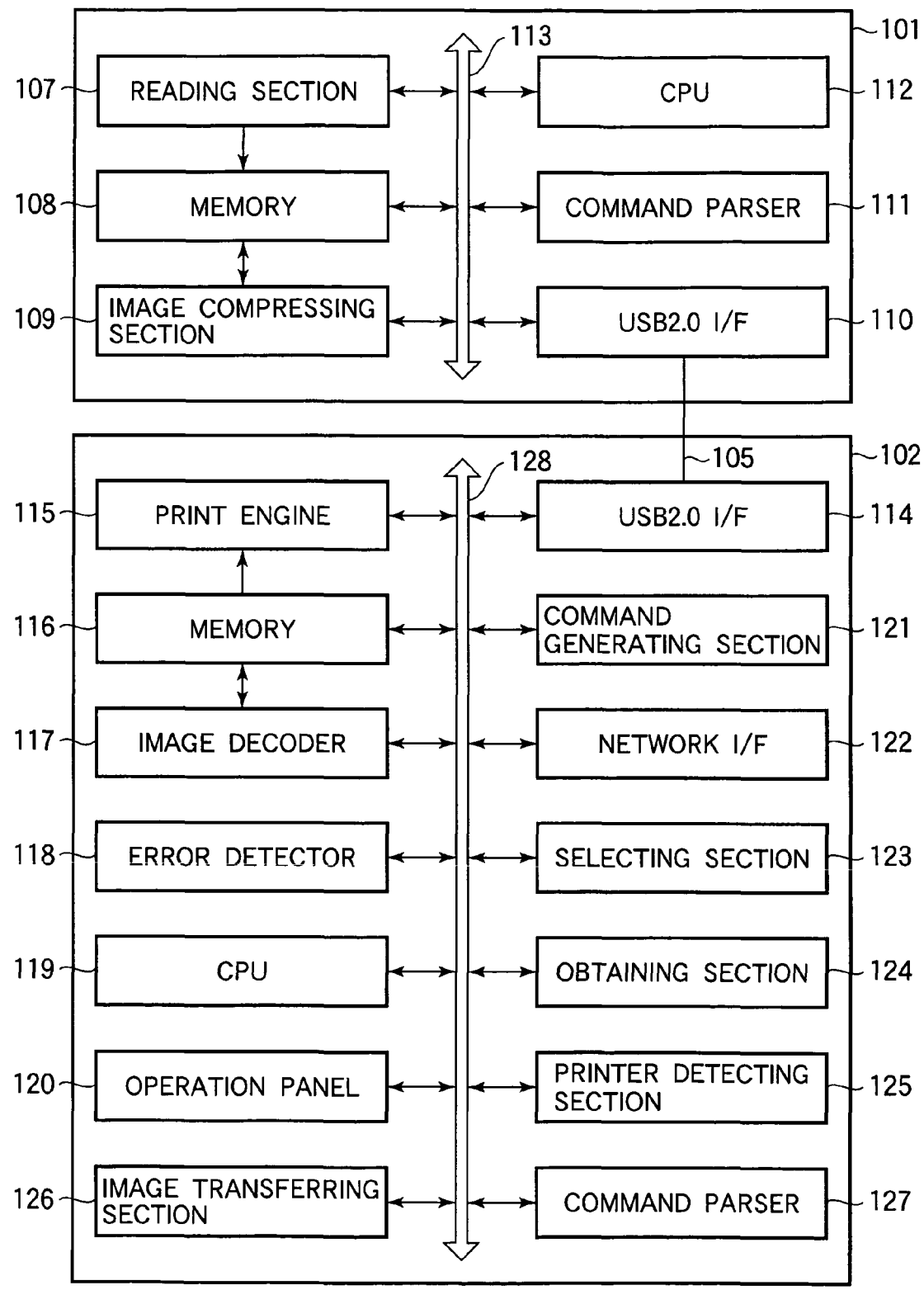
FIG. 2 illustrates the general configuration of an image processing apparatus of the first embodiment.

FIG. 2 illustrates the general configuration of an image processing apparatus 100 of the first embodiment. The printer 104 is a monochrome printer that supports printer control language (PCL), and is capable of decoding image data encoded in joint bi-level image experts group (JBEG).

The image processing apparatus 100 will be described in detail with reference to FIG. 2.

The scanner 101 includes a reading section 107, a memory 108, an image compressing section 109, a central processing unit (CPU) 112, a command parser 111, a USB 2.0 I/F 110, and a common bus 113.

A user operates a later described operation panel 120 to input a command to read an original. Upon receiving the command, the reading section 107 reads the original document by means of an auto document feeder (ADF) or a flat bed.

The memory 108 includes a random access memory (RAM) that temporarily stores image data read by the reading section 107 or image data compressed by the image compressing section 109. The memory 108 also includes a read only memory (ROM) that stores control programs for the scanner 101.

If the image data specified by the user through the operation panel 120 is multi-level data, the image compressing section 109 encodes the image data into JPEG. If the image data is bi-level data, the image compressing section 109 encodes the image data into JBIG, modified-modified MR (MMR), or modified Huffman (MH).

The CPU 112 is a microprocessor that executes the control programs stored in the ROM of the memory 108 to control the overall operation of the scanner 101.

The command parser 111 parses scanner control commands received via the USB 2.0 I/F, and notifies the CPU 112 of the parsed specific controls.

The USB 2.0 I/F 110 is an interface that conforms to USB 2.0.

The common bus 113 is a bus line that connects the respective sections to one another within the scanner 101.

The configuration of the printer 102 will be described. The printer 102 includes a USB 2.0 I/F 114, a print engine 115, a memory 116, an image decoder 117, an error detector 118, a CPU 119, an operation panel 120, a command generating section 121, a network I/F 122, a selecting section 123, an obtaining section 124, a printer detecting section 125, an image transferring section 126, a command parser 127, and a common bus 128.

The USB 2.0 I/F 114 is an interface that conforms to the USB 2.0. Image data received through the USB 2.0 I/F 114 is temporarily stored into the memory 116 under the control of the CPU 119.

The print engine 115 converts the image data stored in the RAM of the memory 116 or the image data decoded by the image decoder 117 into ready-to-print data, and then prints the ready-to-print data.

The memory 116 includes a RAM that temporarily stores the image data received from the scanner 101, and image data decoded by the image decoder 117. The memory 116 also includes a ROM that stores the control programs for performing the overall control of the entire printer 102.

The image decoder 117 decodes the image data in the image format specified by a user via the operation panel 120.

The error detector 118 detects errors that occur in the printer 102. The term "error" is used to cover an event in which printing needs to be stopped. Such events include parts replacement, paper-out, paper jam, open cover, fatal error, and near exhaustion of consumable items. Near exhaustion of consumable items is assumed to be a warning level at which the user is allowed to still command to print.

The CPU 119 is a microprocessor that executes the control programs stored in the ROM of the memory 116, thereby performing the overall control of the printer 102.

FIG. 3 illustrates the operation panel 120. The operation panel 120 includes a start button 120a that sends a command to the scanner 101 to initiate a copying operation, a cancel button 120b for canceling a copying operation, a menu button 120c for setting an image format, arrow keys 120d in a cross arrangement, and a liquid crystal display (LCD) 120e. The LCD 120e displays the status conditions of the scanner 101 and printer 102, details of errors, and actual processing for error handling.

Based on the commands input by the user via the operation panel 120, the command generating section 121 generates scanner controlling commands for controlling the scanner 101.

The network I/F 122 communicates information and data with external devices according to the transmission control protocol/internet protocol (TCP/IP).

The selecting section 123 selects a printer that supports the image data format specified by the user through the operation panel 120, the printer being selected according to a management information base (MIB) of simple network management protocol (SNMP). MIB is information required for network management, and is communicated according to SNMP between a management host (i.e., image processing apparatus 100) and devices an image forming apparatus (e.g., printers 103 and 104 on the network) under the management of the management host. MIB is defined by request for comments (RFC) 1213.

The obtaining section 124 obtains an MIB of SNMP related to the image formation parameters including functions and status conditions of a printer detected by the printer detecting section 125, which will be described later.

By means of SNMP broadcast, the printer detecting section 125 obtains MIBs from the respective devices, and detects printers connected to the network based on the MIBs.

The image transferring section 126 transfers the image data received from the scanner 101 or the image data decoded by the image decoder 117 to image forming apparatuses including the printer 103 and printer 104 selected by the selecting section 123, so that the destination image forming apparatus for the image data is displayed on the LCD 120e of the operation panel 120.

The command parser 127 parses the response of the scanner 101 to the scanner control command.

The common bus 128 is a bus line via which the respective sections in the printer 102 are connected to one another.

FIG. 4 illustrates an example of specific instructions for controlling the scanner 101, the instructions being displayed on the operation panel 120. In accordance with the respective items on the screen of the operation panel 120 selected by the user, the command generating section 121 generates scanner control commands.

Figure 5:
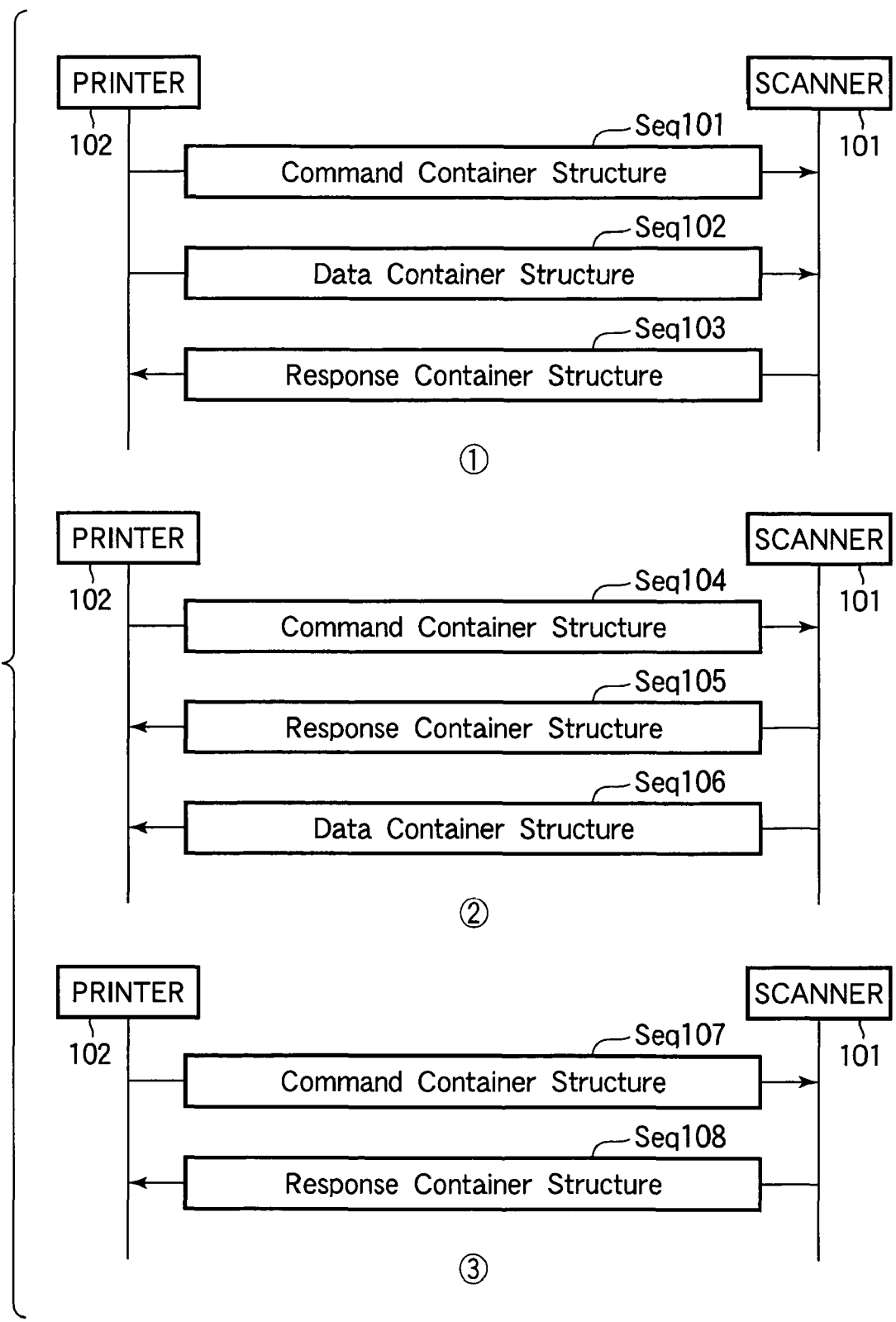
FIG. 5 illustrates a sequence of scanner control commands.

FIG. 5 illustrates a sequence of scanner control commands. There are three scanner controlling sequences: commanding a copying operation, checking for an original at the ADF, and canceling a copying operation.

Sequence 1

When a copying operation is commanded, the following sequence is executed. The printer 102 sends Command Container Structure to the scanner 101 (Seq. 101), and then Data Container Structure to the scanner 101 (Seq. 102). The scanner 101 sends Response Container Structure back to the printer 102 (Seq. 103).

Sequence 2

When a check is made to determine whether an original is present at the ADF, the following sequence is executed. The printer 102 sends Command Container Structure to the scanner 101 (Seq. 104). The scanner 101 sends Response Container Structure back to the printer 102 (Seq. 105). When data in the scanner 101 becomes ready to be sent, the scanner 101 sends Data Container Structure to the printer 102 (Seq. 106).

Sequence 3

When a check is made to determine whether a copying operation has been cancelled, the following sequence is executed. The printer 102 sends Command Container Structure to the scanner 101 (Seq. 107). Then, the scanner 101 sends Response Container Structure back to the printer 102 (Seq. 108).

FIG. 6 illustrates the structure of the respective Container Structure illustrated in FIG. 5.

FIG. 7 illustrates scanner controlling command codes used in the respective Container Structures.

A description will now be given of how MIBs are obtained. As described above, MIB is information necessary for network management. FIG. 8 illustrates examples of MIB. MIB includes image formation parameters, i.e., setting information and management information specific to the respective devices connected to the network. These items of information are stored in the respective devices.

The obtaining section 124 transmits, for example, printer job language (PJL) commands to an image forming apparatus on the network in order to obtain the MIB of the image forming apparatus.

Based on the obtained MIB information, the image processing apparatus 100 obtains management information. The management information includes settings of the image forming apparatus connected to the network and information on whether the image forming apparatus is ready to print.

{Setup and Reading Operations of Scanner}

Figure 10:
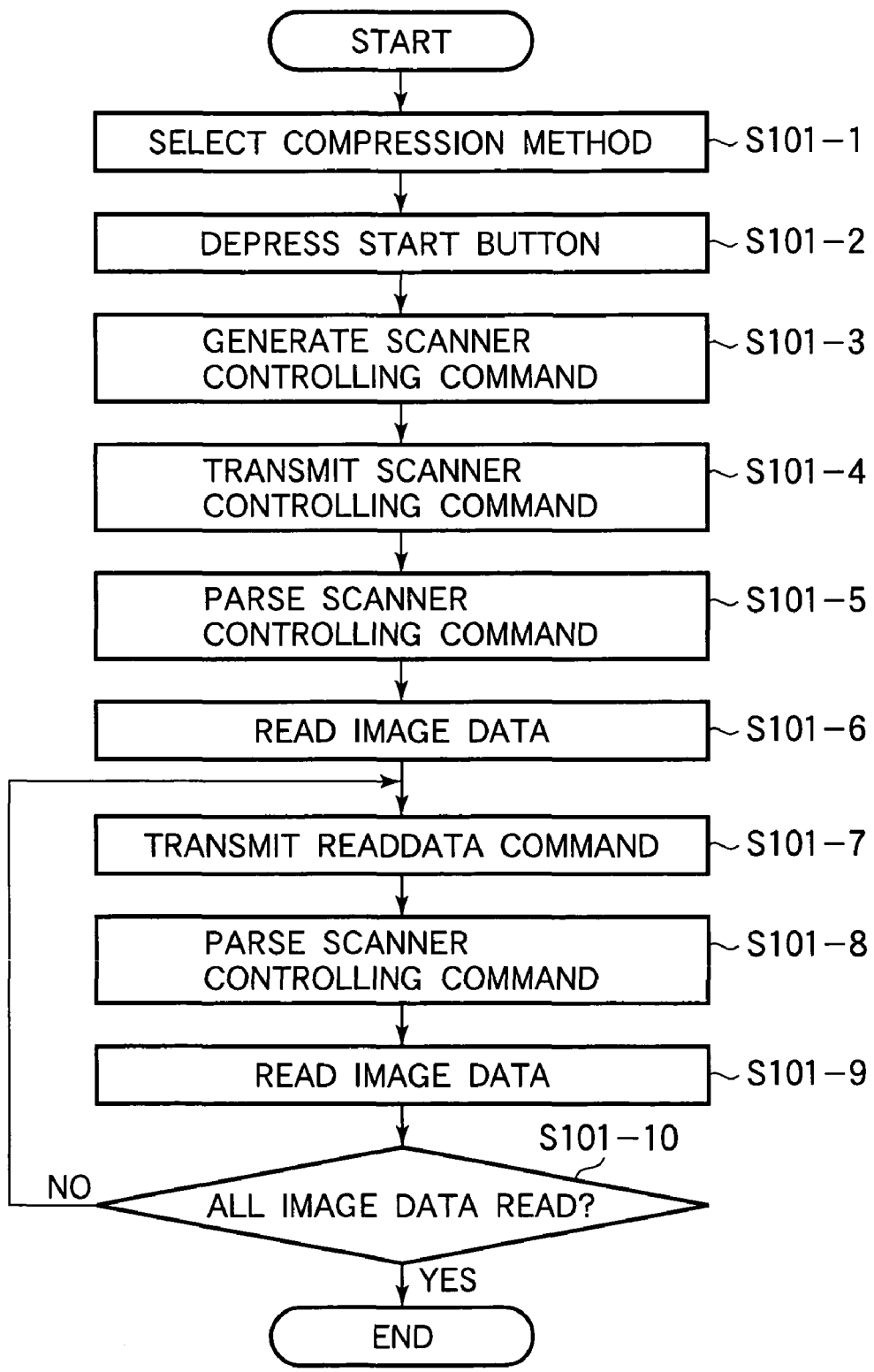
FIG. 10 is a flowchart illustrating the setup operation and reading operation of the scanner.

FIG. 10 is a flowchart illustrating the setup operation and reading operation of the scanner 101.

The setup and reading operations of the first embodiment will be described with reference to FIG. 10.

The user operates a menu button 120c to select a compression method for compressing the image read via the reading section 107. Here, JPEG is set (step S101-1).

The user depresses the start button 120a of the operation panel 120 (step S101-2).

The command generating section 121 generates a scanner controlling command for setting a copying operation and a scanner controlling command for starting the copying operation (step S101-3).

The command generating section 121 transmits the generated scanner controlling commands to the USB2.0 I/F 110 (step S101-4).

The command parser 111 of the scanner 101 parses the received scanner controlling commands (step S101-5).

After parsing the commands, the command parser 111 outputs a command to read the original to the reading section 107. Then, the reading section 107 reads the image data from the original, and then sends a command response "OK" to the USB 2.0 I/F 114 (step S101-6).

The image data is temporarily stored into the memory 108. The image compressing section 109 compresses the image data stored in the memory 108 into a JPEG format selected at step S101-1, and then writes the compressed image data back into the memory 108.

To obtain the image data, the printer 102 transmits a readData command to the USB2.0 I/F 110 (step S101-7).

The command parser 111 parses the received scanner controlling commands (step S101-8).

After parsing the readData command, the CPU 112 reads image data by a predetermined size from the memory 108, and then transmits the image data to the USB2.0 I/F 114 (step S101-9).

The image data received at the USB2.0 I/F 114 is stored into the memory 116 (step S101-10). The steps S101-7 to S101-10 are repeated until the entire image data has been read.

Figure 11:
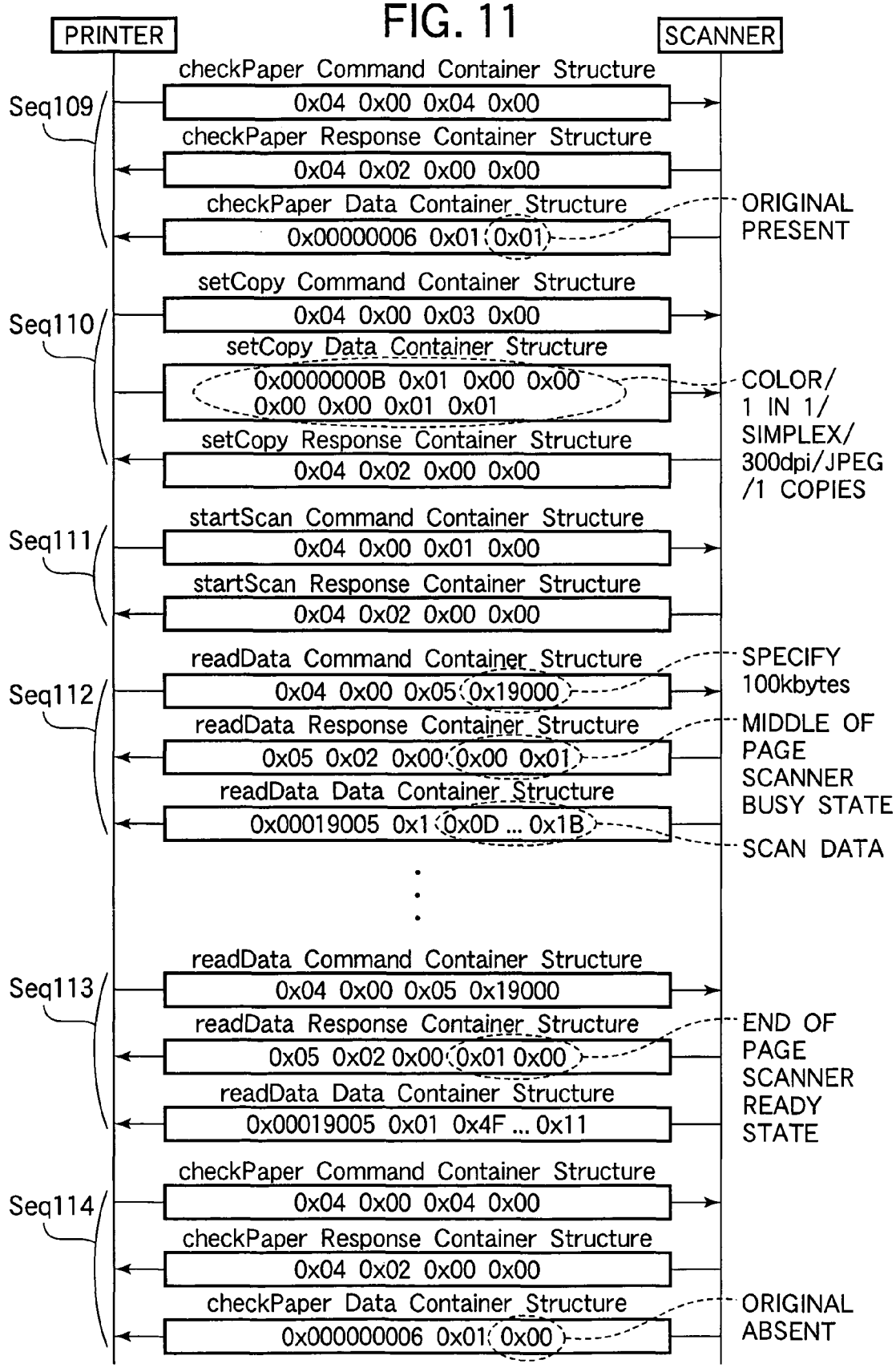
FIG. 11 illustrates a sequence of the scanner controlling commands in a specific copying operation in an ADF mode.

FIG. 11 illustrates a sequence of the scanner controlling commands in a specific copying operation in an ADF mode. At Seq. 109, a check is made to determine whether the original is present in the ADF.

At Seq. 110, copying conditions (i.e., color, N-up, Duplex/Simplex, resolution, compression method, and the number of copies) are set to "Color/1 in 1/Simplex/300 dpi/JPEG/1 copy" using the commands shown in FIG. 7.

At Seq. 111, a reading control is invoked, and then data is read at Seq. 112 and Seq. 113 by 100 Kbytes at a time.

At Seq. 113, the end of a page and a scanner Ready state are detected. At Seq. 114, a check is made to determine whether the original remains at the ADF. If the original is not present in the ADF, then it is determined that the reading operation of the original has been completed.

{Operation of Image Forming Apparatus}

FIG. 9 is a flowchart illustrating the operation of the image processing apparatus. The operation of the image processing apparatus will be described with reference to FIG. 9.

At step S101, the user sets up the scanner 101 and commands the scanner 101 to read an original as described previously with reference to FIG. 10.

When the reading operation in FIG. 9 has been completed, the program proceeds to step S102.

At step S102, the command parser 127 confirms that image data for one page has been read. Thereafter, the image decoder 117 decodes the image data stored in the memory 116, and then the decoded image data is stored back into the memory 116. Then, the print engine 115 converts the decoded image data stored in the memory 116 into a data format that can be directly printed, and then prints the converted data.

At step S103, the error detecting section 118 watches for errors at all times when the print engine 115 is printing the image data.

If no error is detected by the error detecting section 118 at step S103, the copying operation completes upon completion of printing at step S104.

If an error is detected by the error detecting section 118 at step S103, then the printer detecting section 125 inquires the network by means of broadcast.

The printer detecting, section 125 receives MIBs from the respective devices, each MIB describing the type of a corresponding device. Then, from among the MIBs, the printer detecting section 125 detects MIBs that describe printers, thereby detecting printers.

If the printer detecting section 125 fails to detect any printer, the error detecting section 118 detects an error, which in turn is displayed on an LCD 120e of the operation panel 120 (step S106).

When an error has been removed, the print engine 115 resumes printing (step S107).

When the printer detecting section 125 has detected printers, the obtaining section 124 obtains MIBs from the detected printers each of which has a set of functions and status conditions shown in FIG. 8 (step S108).

Based on the functions and status conditions of the printers shown in FIG. 8, the selecting section 123 selects a printer that supports the instant printing operation. For example, a printer is selected from among printers in which DEVICE STATUS is "others (no error and no warning have occurred)," PRINTER STATUS is "idle," FAMILY NAME of Page Description Language or Control Language includes "PS (postscript)," and the DECODER is "JPEG" (STEP S109).

Referring to FIG. 1, the printer 103 is selected. Other criteria for selecting an appropriate printer include those relating to a copying operation, i.e., color printing, duplex printing, stapling, punching, and whether the paper size is the same as the original. These selection criteria may be preset. Alternatively, printers may be displayed so that the user is allowed to select a preferred one.

If the selecting section 123 fails to select a printer, the error detecting section 118 detects an error, which in turn is displayed on an LCD 120e of the operation panel 120 (NO at step S110).

The image data of the printing operation that the print engine 115 has not yet been completed is transferred to the printer 103, thereby printing the remaining portion of the printing operation (step S111). For example, when an error occurs shortly after the data for a certain page has been printed, an alternative printer (i.e., destination printer) may begin to print the image data for the following page onward. The alternative printer may be configured such that the alternative printer receives image data for subsequent pages including a page whose printing failed, if an error occurs in the middle of printing on the certain page.

When printing is being performed in the duplex mode, if printing only on one side has been completed, the alternative printer may print the image data either for both sides again or the image data for the remaining side only. Likewise, when an error occurs in the middle of the printing on a certain page in the N-up mode, the alternative printer may print the image data for one complete page again or the image data for the remaining portion of the page.

The LED 120e displays to the user the name or IP address of a destination printer to which the image data is transferred or a map that describes the positional relations between the destination printer 103 and the scanner 101 (step S112). Upon completion of the printing at the destination printer, the copying operation completes. The user goes to the destination printer to pick up the printout.

As described above, the image data read from an original may be printed out by an alternative printer (i.e., destination printer) that is in the same status conditions as the instant printer and that supports the same functions as the instant printer.

Second Embodiment

Figure 12:
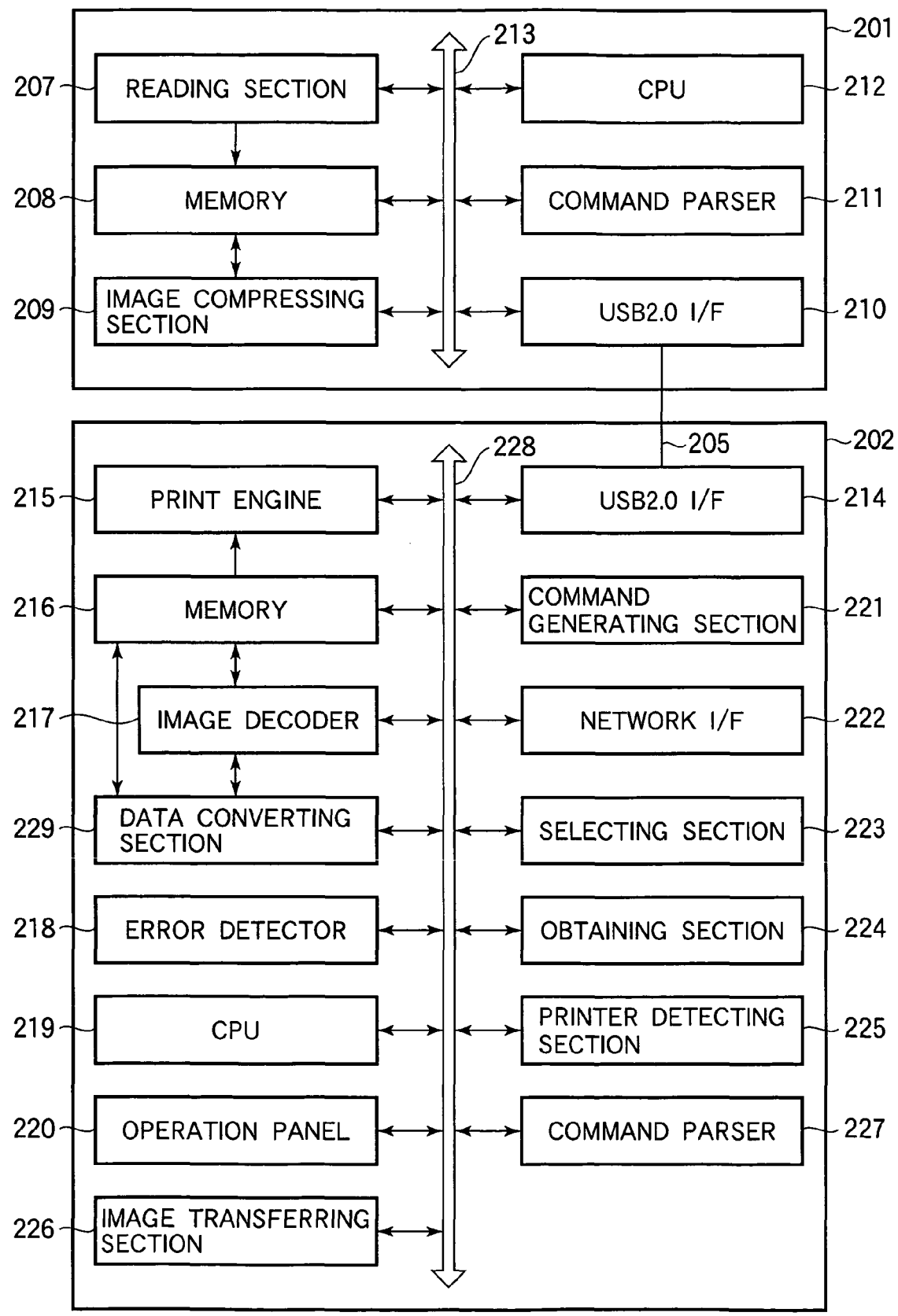
FIG. 12 illustrates the general configuration of an image processing apparatus (multi function printer, MFP) of a second embodiment.

FIG. 12 illustrates the general configuration of an image processing apparatus (multi function printer, MFP) 100 of a second embodiment.

The configuration of a scanner 201 is similar to that of the first embodiment. A printer 202 includes a USB 2.0 I/F 214, a print engine 215, an image decoding section 217, an error detecting section 218, an operation panel 220, a command generating section 221, a network I/F 222, an obtaining section 224, a printer detecting section 225, a command parser section 227, which have the same functions as those of the first embodiment.

A memory 216 includes two RAMs. One of the two RAMs stores image data received from the scanner 201 and image data decoded by the image decoding section 217. The other of the RAMs is used as a temporary memory when a data converting section 229 converts data. The memory 216 also includes a ROM that stores control programs for the printer 202.

A CPU 219 is a microprocessor that executes the control programs stored in the ROM of the memory 216 to control the overall operations of the printer 202.

When image data in an image format specified by a user through the operation panel 220 is to be printed, a selecting section 223 selects a printer capable of printing the image data. This printer is selected based on the MIB of SNMP obtained by the obtaining section 224. If the selecting section 223 fails to select this printer, then the selecting section 223 instructs the data converting section 229 to convert the compressed image data into a compression form that is supported by a printer first obtained by the obtaining section 224. Then, the selecting section 223 selects a printer capable of decoding the image data converted into that compression form.

An image transfer section 226 transfers the image data received from the scanner 201, image data decoded by the image decoding section 217, or the compressed image data converted by the data converting section 229 to the destination printer selected by the selecting section 223. The image transfer section 226 then displays the destination printer on the LED of the operation panel 220.

A common bus 228 is a bus line through which the respective sections of the printer 202 are connected to one another.

The data converting section 229 instructs the image decoding section 217 to decode the compressed image data stored in the memory 216, and then to compress the decoded image data into the compression form specified by the selecting section 223.

Figure 13:
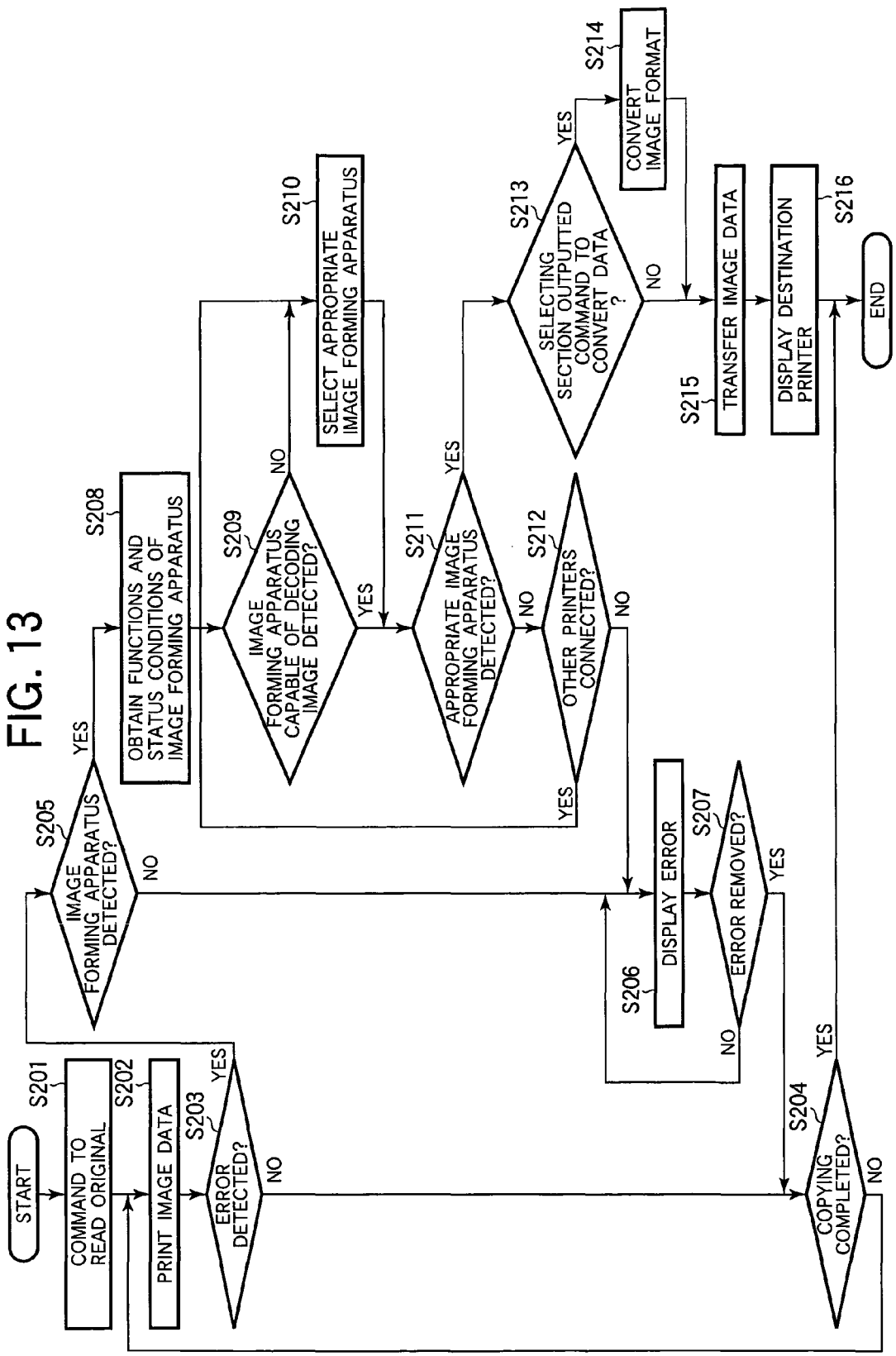
FIG. 13 is a flowchart illustrating the operation of the second embodiment.

FIG. 13 is a flowchart illustrating the operation of the second embodiment. The operation of the second embodiment will be described with reference to FIGS. 12 and 13.

The operations at steps S201-S207 are the same as those at steps S101-S107 of the first embodiment, and therefore the detailed description is omitted.

Once the printer detecting section 225 has detected printers, the obtaining section 224 obtains the MIBs from the respective printers, each MIB containing the functions and status conditions of a corresponding printer (S208).

Based on the MIBs obtained by the obtaining section 224, the selecting section 223 detects printers capable of decoding the image data compressed in the compression method specified through the operation panel 220 (step S209).

An appropriate one of the printers is selected (S210). A Based on the functions and status conditions of the detected printers, a check is made to determine whether at least one of the detected printers is capable of printing the image data (S211). If YES at step S211, the program proceeds to step S213. If no appropriate printer is detected (N at step S211), a check is made to determine whether other printers than those detected at S208 are connected to the network (S212). If YES at step S212, then the program jumps to step S210 where an appropriate printer is selected, and then the program proceeds to step S211.

The destination printer may also be selected in terms of copying conditions including the ability to perform color printing, duplex printing, stapling, punching, and paper size.

If it is determined that no other printer than those detected at step S209 exists in the network (N at S212), the program proceeds to step S206.

A check is made at step S213 whether the selecting section 223 has outputted an instruction to convert data. If YES at step S213, the program proceeds to step S214. If NO at step S213, the program proceeds to step S215 (S213).

At step S214, the data converting section 229 causes the image decoding section 217 to decode the compressed image data stored in the memory 216, and then compresses the decoded image data into the compression form specified by the selecting section 223.

At step S215, the image transfer section 226 transfers the image data for the page, at which printing was interrupted due to the occurrence of an error, to the printer selected by the selecting section 223, thereby continuing the printing.

The destination printer to which the image data is transferred is displayed on the LCD of the operation panel 220. Upon completion of printing in the destination printer, the present print job completes.

The image forming apparatus may also be configured as follows: If an error occurs immediately after the printing of one page has been completed and before the printing of the next page begins, the whole next page may be printed by the destination printer. The destination printer may be configured such that if an error occurs in the middle of printing a certain page, the destination printer prints that page all over again.

{Specific Example of Second Embodiment}

Figure 14:
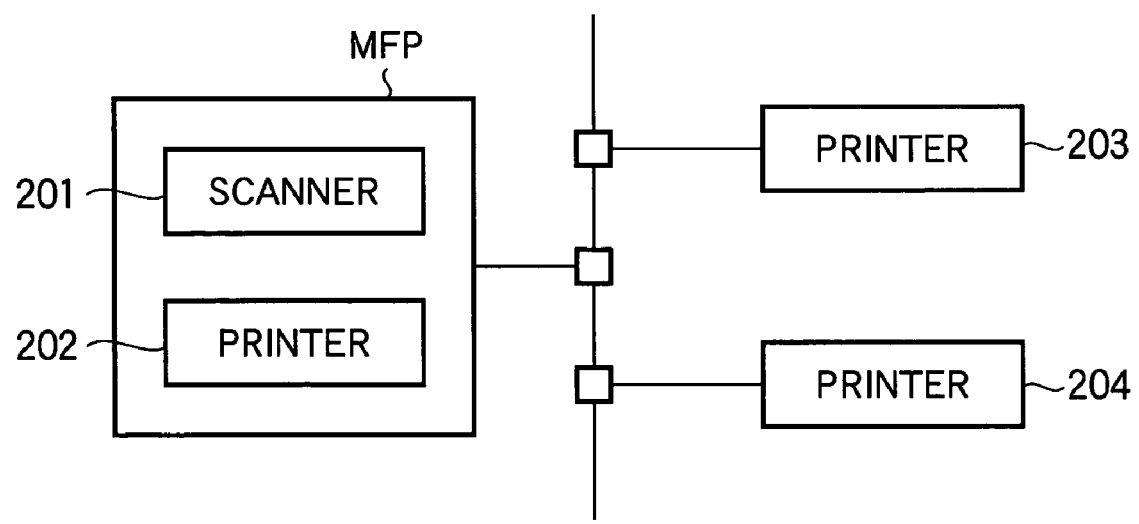
FIG. 14 illustrates an example of the second embodiment.

FIG. 14 illustrates an example of the second embodiment. The example of the second embodiment will be described with reference to FIG. 14. Referring to FIG. 14, a multi function printer (MFP) includes a scanner 201 and a printer 202 and the MFP is connected to printers 203 and 204 via the network. The image data read by the scanner 201 is compressed by an algorithm A1. The printer 203 is capable of decoding data compressed by an algorithm A2 and the printer 204 is capable of decoding image data compressed by an algorithm A3.

The printer detecting section 225 detects printers on the network in a certain order (e.g., the printer 203 is first detected and then the printer 204 is detected). Because printers on the network are not capable of decoding the image data compressed by the algorithm A1, the selecting section 223 instructs the data converting section 229 to convert the image data compressed by the algorithm A1 into another algorithm, for example, A2.

The data converting section 225 causes the image decoding section 217 to decode the image data compressed by the algorithm A1. Then, the data converting section 225 compresses the decoded image data into the algorithm A2, and then transfers the compressed data to the printer 203 which in turn prints the data.

The aforementioned configuration may be altered such that image decoding section 217 decodes the image data compressed by the algorithm A1. The data converting section 225 compresses the decoded image data into the algorithm A3, and then the compressed image data may be transferred to the printer 204. Here, it is assumed that the MFP supports the algorithms A1-A3.

The destination printer may be configured such that if an error occurs in the duplex mode immediately after having printed on one side of a medium and before printing on the other side, the image data is printed on both sides of the medium again. Alternatively, the destination printer may print only on the other side of the medium. Likewise, when an error occurs in the middle of the printing on one page in an N-up mode, the destination printer may print the image data for one complete page again or the image data for the remaining portion of the page.

As described above, the second embodiment allows printing by a still alternative printer even when selecting section 123 fails to select a printer capable of decoding the compressed image data read from an original.

Third Embodiment

An image processing apparatus (multi function printer, MFP) of a third embodiment includes a reading section but not an image forming section. The image data read by the reading section is transferred to one of image forming apparatuses connected to the network.

Figure 15:
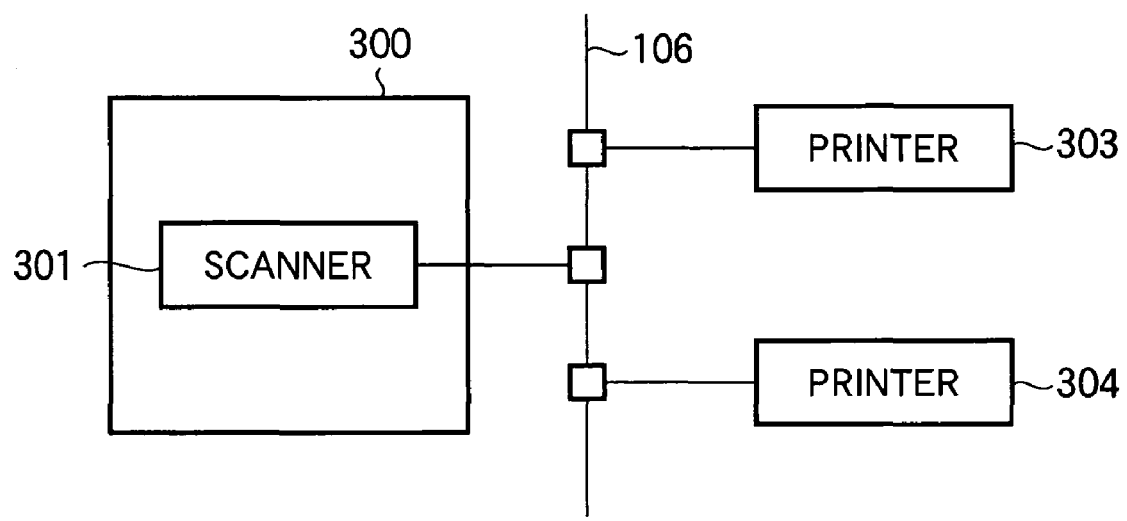
FIG. 15 illustrates the third embodiment.
Figure 16:
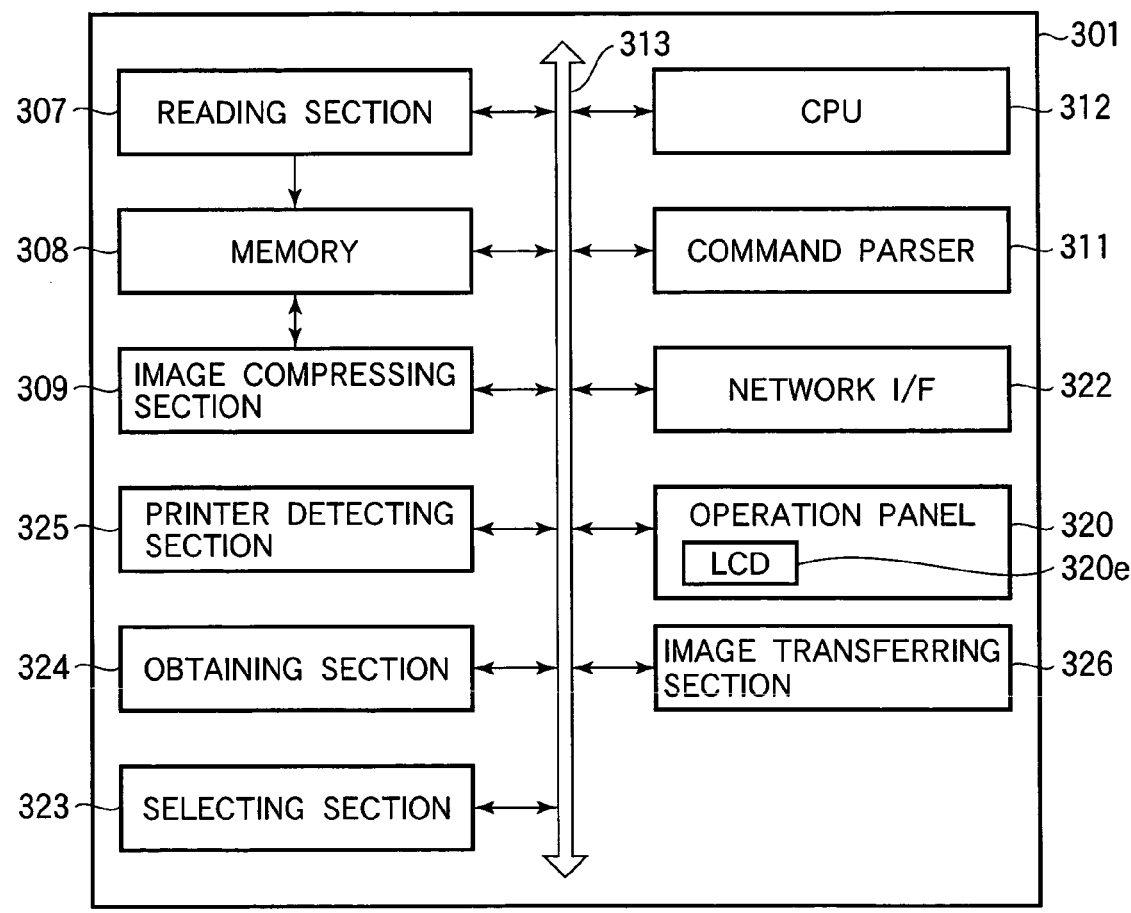
FIG. 16 is a block diagram of a scanner.
Figure 17:
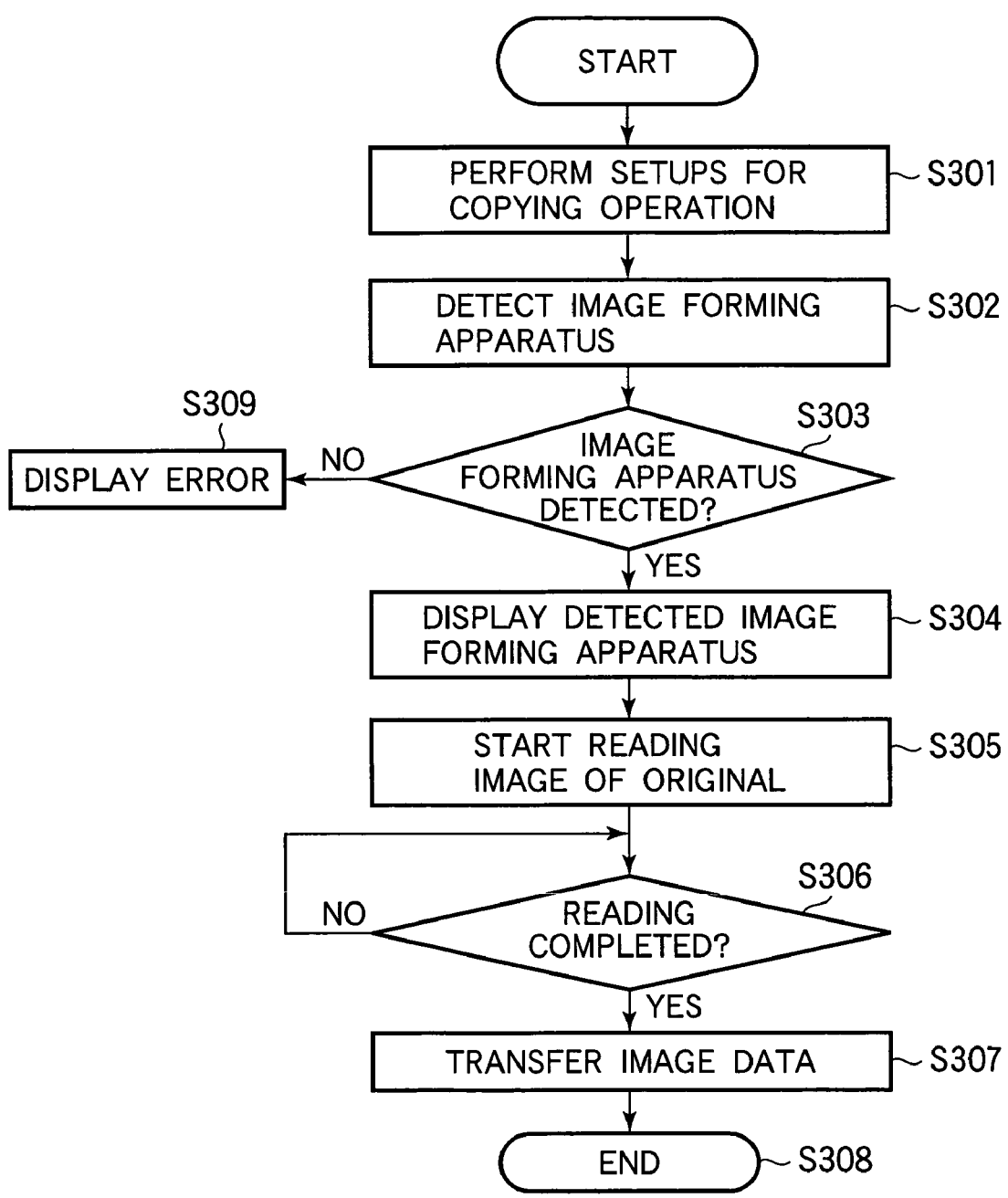
FIG. 17 is a flowchart illustrating the operation of the third embodiment.

FIG. 15 illustrates the third embodiment. FIG. 16 is a block diagram of a scanner 301. FIG. 17 is a flowchart illustrating the operation of the third embodiment. Elements similar to those of the first and second embodiments have been given the same reference numerals and their description is omitted.

Referring to FIG. 15, an image processing apparatus 300 includes the scanner 301, and is coupled to the image forming apparatuses, i.e., printers 303 and 304 via a wired or wireless local area network (LAN).

Referring to FIG. 16, the scanner 301 includes a reading section 307, a memory 308, an image compressing section 309, a command parser 311, a CPU 312, an operation panel 320, a network I/F 322, a selecting section 323, an obtaining section 324, a printer detecting section 325, an image data section 326, which are connected one another via common bus 313. The operations of the aforementioned sections are essentially the same as those of the sections of the first and second embodiments, and their description is omitted. The operation of the respective section will be described with reference to FIG. 17 only with respect to that different from the first and second embodiments.

FIG. 17 is a flowchart illustrating the operation of the third embodiment.

At step S301, a user places an original to be copied from on the scanner 300, and performs various setups for a copying operation through the operation panel 120. Specifically, the user inputs a desired resolution, color printing or monochrome printing, and the compression method of image data. The image data is read by the reading section 307, and is stored into the memory 108. The image data is compressed by the image compressing section 109. The information including the desired resolution and color/monochrome printing is also stored into the memory 108. Then, the program proceeds to step S302.

At step S302, the printer detecting section 325 detects image forming apparatuses (i.e., printers) on the network by means of broadcast of SNMP while also obtaining MIBs from the respective devices. The obtaining section 324 obtains the MIB of SNMP representative of the functions and status conditions of the printers detected by the printer detecting section 325. Based on the MIBs of SNMP obtained by the obtaining section 324 and the image data format specified by the user through the operation panel 320, the selecting section 323 selects a printer ready to print. For example, if the user has specified color printing and a resolution of 600 dpi at step S301, the selecting section 323 selects a printer ready to print based on the information in the memory 308 stored at S301 and the MIBs of SNMP obtained by the obtaining section 324.

At step S303, if an image forming apparatus ready to print is not be detected, the program proceeds to step S309 where an error is displayed. If an image forming apparatus ready to print is detected, the program proceeds to step S304.

At step S304, the image forming apparatuses detected and selected at step S302 are displayed on the screen of the operation panel 320. For example, a message "Your scanned image data may be printed by the following printers. Please select one." may be displayed to the user. The image processing apparatus may be configured such that printing conditions including N-up and duplex/simplex are set to the selected printer. Once the user has selected a desired one of the displayed printers, the program proceeds to step S305.

At step S305, the reading section 107 starts reading the image of the original.

At step S306, a check is made to determine whether the reading section 307 has read the image of the original completely.

At step S307, the transfer section 326 transfers the image data of the original to the printer selected by the user. The LCD 320e of the operation panel 320 displays the name and IP address of the destination printer and a map that shows the relation between the image processing apparatus and the printer in terms of the locations on the network. Upon completion of printing of the image data, the copying operation completes and the user goes to the printer to pick up the printout.

The aforementioned copying operation is performed by the image processing apparatus 300 not equipped with a printer. The aforementioned copying operation may also be performed by an image processing apparatus that incorporates a printer.

The third embodiment is advantageous in that when an image processing apparatus is not equipped with a printer, the user is able to select an image forming apparatus that is on the network and that is capable of performing desired image formation.

Even if the image processing apparatus 300 is equipped with a printer, the user is allowed to select an image forming apparatus that is on the network and that is capable of forming desired image formation.

What is claimed is:

1. An image processing apparatus comprising:
a reading section that reads an image of an original;
an image forming section that forms the image of the original on a medium;
an image compressing section configured to compress the image read by the reading section, the image being compressed into a first compression form;
an image decoder configured to decode the image in the first compression form;
a converting section configured to convert the decoded image into a second compression form;
a first detecting section configured to detect an error in said image forming section;
a network connecting section that connects the image processing apparatus to a network;
a second detecting section configured to detect at least one image forming apparatus connected to the network, the at least one image forming apparatus being detected when said first detecting section has detected the error;
an obtaining section configured to obtain image formation parameters of the at least one image forming apparatus detected by said second detecting section;
a selecting section configured to select an image forming apparatus from the at least one image forming apparatus after said first detecting section has detected the error; and
an image transferring section configured to transfer the image either in the first compression form or in the second compression form to the selected image forming apparatus;
wherein when said first detecting section has detected the error, said selecting section determines based on the image formation parameters whether the at least one image forming apparatus is capable of printing the image in the first compression form;
wherein when said first detecting image has not detected the error, the image forming section forms the image on the medium; and
wherein if the selecting section fails to select an image forming apparatus capable of printing the image in the first compression form but finds an image forming apparatus capable of printing the image in the second compression form, the converting section converts the decoded image into the second compression form and the image transferring section sends the image in the second compression form to the image forming apparatus capable of printing the image in the second compression form.

2. The image processing apparatus according to claim 1, wherein the image formation parameters are stored in the image forming apparatus and include functions and/or status conditions of the image forming apparatus.

3. The image processing apparatus according to claim 1, wherein the image formation parameters include management information specific to the image forming apparatus.

4. The image processing apparatus according to claim 1, further comprising an operation panel through which a user inputs a compression method for image processing;
wherein said operation panel displays the image forming apparatus to which the image data is transferred by said image transferring section.

* * * * *